350-96.23

6/14/83

OR 4,387,958

United States Patent [19]

Zeidler et al.

[11] 4,387,958

[45] Jun. 14, 1983

[54] LONGITUDINALLY WATER-TIGHT CABLES AND METHOD OF PRODUCING THE SAME

[75] Inventors: Guenter Zeidler, Germering; Gerhard Lange; Helmut Saller, both of Munich, all of Fed. Rep. of Germany

[73] Assignee: Siemens Aktiengesellschaft, Berlin & Munich, Fed. Rep. of Germany

[21] Appl. No.: 379,368

[22] Filed: May 18, 1982

Related U.S. Application Data

[63] Continuation of Ser. No. 261,786, May 8, 1981, abandoned.

[30] Foreign Application Priority Data

May 12, 1980 [DE] Fed. Rep. of Germany ....... 3018141

Dec. 19, 1980 [DE] Fed. Rep. of Germany ....... 3048074

[51] Int. Cl.[3] ........................ B32B 27/00; G02B 5/16; H02G 15/20

[52] U.S. Cl. ................................ 350/96.23; 428/372; 156/48; 174/23 C; 428/383; 428/398; 428/376

[58] Field of Search ............... 428/375, 383, 376, 379, 428/398, 372; 174/23 C; 350/96.23; 156/48

[56] References Cited

U.S. PATENT DOCUMENTS

| | | | |
|---|---|---|---|
| 1,524,124 | 1/1925 | Fisher et al. | 174/23 C |
| 3,607,487 | 9/1971 | Biskeborn | 156/48 X |
| 3,733,427 | 5/1973 | Clark et al. | 174/23 C |
| 3,830,953 | 8/1974 | Wood et al. | 156/48 X |
| 3,856,980 | 12/1974 | Puckowski et al. | 174/23 C |
| 3,875,323 | 4/1975 | Bopp et al. | 156/48 X |
| 3,893,961 | 7/1975 | Walton et al. | 260/23 H |

FOREIGN PATENT DOCUMENTS

| | | | |
|---|---|---|---|
| 991716 | 6/1976 | Canada | 174/23 C |
| 18863 | 10/1971 | Fed. Rep. of Germany | 174/23 C |
| 2243615 | 3/1974 | Fed. Rep. of Germany | 174/23 C |
| 2716524 | 10/1978 | Fed. Rep. of Germany | 174/23 C |
| 50-14347 | 5/1975 | Japan | 174/23 C |
| 55-28164 | 7/1980 | Japan | 174/23 C |

*Primary Examiner*—Lorraine T. Kendell

*Attorney, Agent, or Firm*—Hill, Van Santen, Steadman, Chiara & Simpson

[57] ABSTRACT

Longitudinally water-tight cables, such as communication cables, are produced so that the interior of such cables contain a filling material which includes a water-repelling substance and relatively small diameter gas bubbles substantially uniformly embedded therein. The filling material contains an admixture of thermoplastic rubbers or rubber-like thermoplastic materials which are molten at the processing temperature utilized in the course of cable filling and which solidify at the normal operating temperature range of a cable by linking, hooking or coupling via thermoplastic blocks having a correspondingly low melting range, that is lying just below the cable filling temperature. The gas bubbles, which are generated during cable filling, are maintained at their respective spatial positions within the filling material by a rubber-like network which forms in the filling material and the linking or joining points in such network can withstand the buoyancy forces of the gas bubbles without rupture.

9 Claims, 1 Drawing Figure

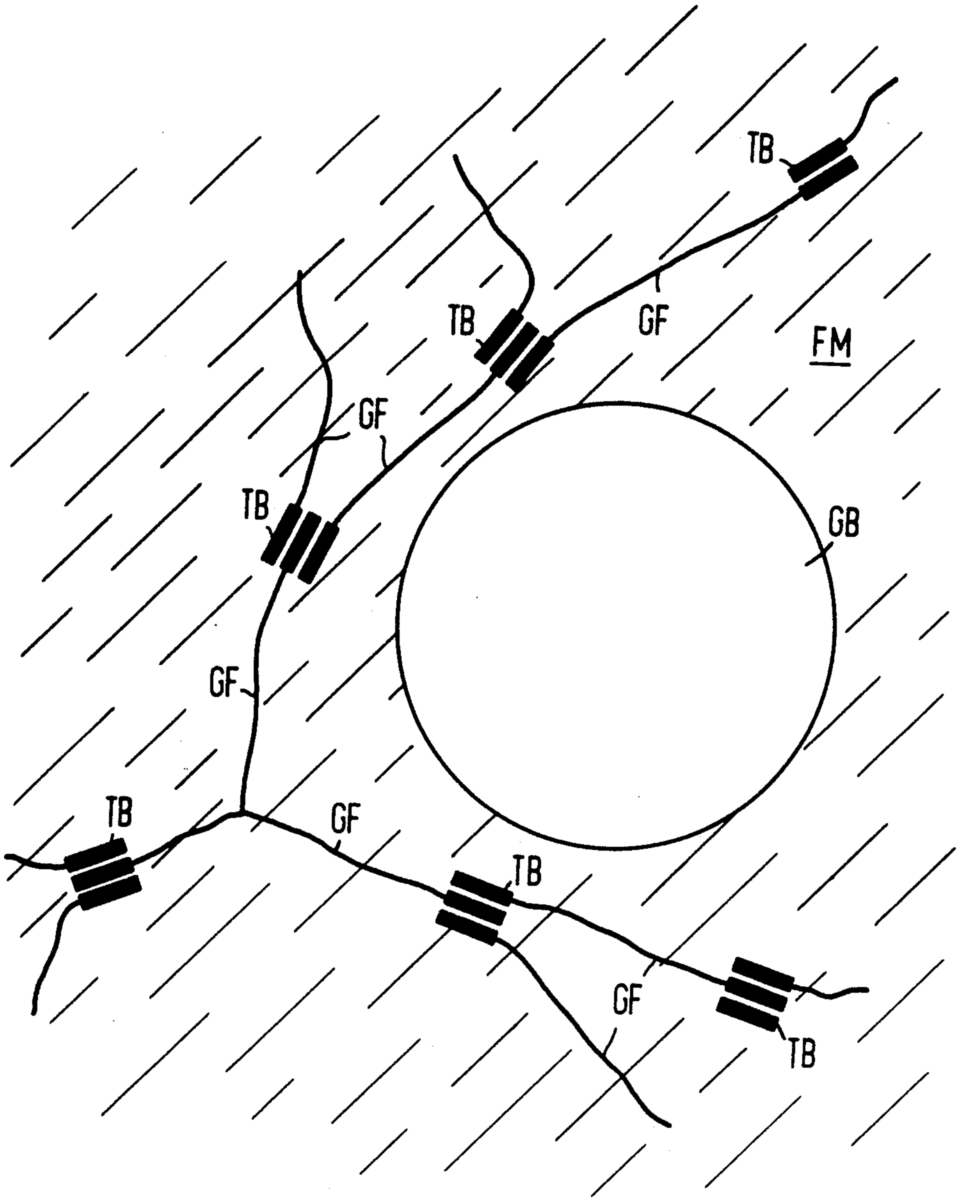
TB
TB
GF
FM
GF
TB
GB
GF
TB
GF
TB
GF
TB

LONGITUDINALLY WATER-TIGHT CABLES AND METHOD OF PRODUCING THE SAME

This is a continuation of application Ser. No. 261,786, filed May 8, 1981 now abandoned.

BACKGROUND OF THE INVENTION

1. Field of the Invention

The invention relates to longitudinally water-tight cables and somewhat more particularly to communication cables having in their interior a filling material containing a water-repellant substance and relatively small gas bubbles embedded therein.

2. Prior Art

Longitudinally water-tight cables having in their interior a filling material containing a water-repellant substance and relatively small gas bubbles embedded therein are known from German Offenlegungsschrift No. 27 16 524. However, the emplacement of the gas bubbles in such filling material within these cables is such that their position in the filling material is not stable without further ado and there is a danger that larger gas bubbles (which have an unfavorable influence on electrical properties of a cable) may form at specific locations because of the migration and subsequent coupling of the smaller gas bubbles into a larger gas bubble. To avoid this drawback, the prior art attempted to stabilize the respective gas bubble positions by providing supportive components, in the form of fibers, within the filling material. However, the preparation of such added fibers and their subsequent incorporation into water-repelling filling substances requires an additional outlay. Further, the desired effect of such fibers is only assured when the fiber size is approximately of the same magnitude as the size of the small gas bubbles. Fibers which are too large disrupt electrical properties of a cable in an undesirable manner so that a very fine division of the additional fiber components becomes necessary.

SUMMARY OF THE INVENTION

The invention provides an improved cable structure of the type earlier described which includes at least one signal-carrying element embedded in a filling material and a jacket for closing-off or sealing the interior of such structure from the outside but which is simpler to manufacture and whose water-repelling substance and incorporated small gas bubbles are distributed substantially throughout the filling material, are homogeneous per se and the gas bubbles are sufficiently secured against separation or displacement from their respective positions within such filling material.

In accordance with the principles of the invention, the cable filling material contains an admixture of thermoplastic rubbers or rubber-like materials which are molten at the processing temperature utilized in the course of cable filling and which solidify at normal cable operating temperature ranges by linking, hooking or joining via thermoplastic blocks having a correspondingly low melting range, that is lying just below the cable filling temperature and the gas bubbles, which are generated during cable filling, are maintained at their respective spatial positions within the filling material by a rubber-like network which forms in this manner in the filling material and the linking or coupling points of such network can withstand the buoyancy force of the gas bubbles without rupture.

Because the admixture of thermoplastic rubber or rubber-like material which is added to the filling material is still thermoplastically processable at the cable filling temperature, for example, around 80° C., the cable filling process can occur in a relatively simple manner. To accomplish this, the cable filling materials are melted and, for example at temperatures around 80° C., are filled, as by injection, under pressure into a cable core or jacket. At these processing temperatures, the thermoplastic blocks of the block polymers present are also melted, which further aids processing.

After the actual filling process, the cable structure attained in this manner, at the normal operating or working temperatures, nevertheless has a rubber-like network developing in its interior and which is maintained in a relatively fixed position in that the nodes of the solidified thermoplastic end blocks prevent movement of the rubber-like network. Further, the rubber-like network also simultaneously fixes or anchors the gas bubbles in their respective spatial positions within the filling material. In this manner, it is insured that migration of such gas bubbles or even gradual formation of larger gas bubbles does not occur. The foam-like material which is generated is thus sufficiently stabilized.

The thermoplastic blocks utilized in the practice of the invention are preferably composed of polyolefins, preferably having an average molecular chain length of about 25 to 45 carbon atoms and specifically preferred thermoplastic materials include relatively low molecular weight polyethylene (PE) and/or paraffin waxes.

Further, low molecular weight isotactic polymers having relatively short side chains containing at least two methyl groups are also useful for forming thermoplastic blocks utilized in the practice of the invention.

The rubber-like elastic molecular chains constructed in accordance with the principles of the invention can be linear and, more preferably, branched and are preferably comprised of typical diene polymers, in particular butadiene.

In accordance with the principles of the invention, a suitably selected special plastic rubber or rubber-like material is melted together with a given cable filling material (customary mixtures of waxes and oils), admixed into a substantially homogeneous mass and, while still hot or liquified, injected into a cable.

The gas bubbles present in the cable filling material of the invention are, preferably (as in foamed cellulose-PE production) either mixed in the filling material by suitable injection, that is before an actual injection nozzle or the like, of nitrogen or Freon (a registered trademark for a group of halogenated hydrocarbon gases), under relatively high pressure to the stream of filling material being injected into a cable. However, it is also feasible to generate suitable gas bubbles by a propellant having a suitable temperature-pressure dependency. It is important that the gas bubbles, while in the filling means, remain imperceptibly small (this is attained by, for example, adding $TiO_2$ and/or $SiO_2$ to the filling material) so an to enable such extremely small bubbles to be uniformly transported throughout the entire mass of filling material being injected into the cable, while allowing such bubbles to expand to their final size (still relatively small) after release of the relatively high injection pressure to normal ambient pressure, that is after a filled cable exits from a filling means, such as a filling tube or a post-connected sheath extruder. In the finished, that is, cooled cable, the size of the gas bubbles can range from about 1 thousandth of a millimeter up to a maximum of about 1.5 millimeter.

When a cable formed in accordance with the principles of the invention is cooled, for example, after a post-connected extruder, a rubber-like network forms in the cable filling material as was earlier described, the nodes of which are mainly formed by the thermoplastic blocks which are then hardened. The gas bubbles which are generally distributed throughout the water-repelling substance (generally oils and waxes) admixed with these thermoplastic materials are retained or anchored by the network-like threads of the resultant molecular chains. The concentration of elastomeric material (i.e., rubber or rubber-like material) in cable filling materials of the invention must be sufficiently high to accomplish such retention and preferably ranges between about 3 to 30 weight percent, based on the total weight of the filling material. In addition, the filling material must have a sufficiently high viscosity to properly retain the gas bubbles and preferably has a viscosity over about 5,000 cP.

In addition to actual rubber materials, such as natural rubber, which are cross-linked via thermoplastic regions, other rubber-like materials can be utilized in the practice of the invention. For example, non-cross-linked (i.e., linear) polymers having rubber-like characteristics and preferably having an average molecular chain length greater than about 50 carbon atoms can also be used. However, polymers having atactic highly branched molecular structures are preferred, such as, for example, atactic polypropylene (PP) or atactic polyisobutylene.

In embodiments where rubber-like materials are utilized, the molecular chains can couple in such a manner that the characteristics of spatial cross-linked rubber are approximated. In this connection, it is advantageous to work these polymers into rubber-, bituminous- or other cable filling material mixtures in order to attain special characteristics, such as adhesiveness or density. These additives are also recommended for admixture with the elastomer-containint cable filling materials described earlier.

For reasons of cost, it may be advantageous to work only these rubber-like polymers into the oily water-repellant substance typically used for cable fillings and thereby retain the gas bubbles within the resultant labyrinthian network. In order to prevent the gas bubbles from collecting and forming large hollow cavities within a cable over the course of time (particularly in cables destined for high temperature environments), it must be insured through specially formulated filling material components that the time period (shelf life) for collapse of the foam mass is longer than the projected life span of the cable. In order to achieve this, it is practical to insure that polymer chains of sufficient length are present in the rubber-like thermoplastic materials utilized in the practice of the invention. Such higher molecular weight polymers have a melting range of approximately 130° to 200° C., which typically is above the melting range of customary cable filling materials. For this reason, it is practical to first melt or liquify such high molecular polymers at the required higher temperatures and thereafter mix them, at this hot state, with the lower molecular weight constituents (such as paraffin waxes and oils, low molecular weight PE or other oils). Such a premixture of the necessary higher molecular weight chains with the lower molecular weight "softeners" remains workable (plastic or moldable) even at lower temperatures (below the melting range of the higher molecular weight polymers) and can readily be admixed into the filling materials.

In certain embodiments of the invention, in order to attain good processability and good spatial lattice structure in the resultant filling material, admixtures of a polyolefin powder, particularly a polyethylene powder, can be added to the cable filling materials. Preferably, the starting polyolefin material for such powder has about 5,000 to 200,000 carbon atoms per molecule thereof and preferably, such powder has a density in the range of about 0.915 to 0.96 g/ml. Further, the powdered polyolefin preferably has an average grain size of about 20 to 600 μm. Generally, in these embodiments, the amount of polyolefin powder ranges between about 5 to 30 weight percent, based on the total weight of the filling material and more preferably ranges between about 6 to 20 weight percent and most preferably between about 8 and 20 weight percent, on the same basis.

In preferred embodiments of the invention, the average diameter of gas bubbles distributed throughout the filling material of a cable ranges between about 1 to 1500 microns and most preferably between about 20 to 200 microns.

In method embodiments of the invention utilizing polyolefin powder, a measured amount of polyolefin powder can be added to heated filling materials during stirring so as to attain a substantially homogeneous mass and a pressurized gas introduced into such mass and the resultant foam-like material injected into a cable whereby after removal of the pressure and cooling of the material, gas bubbles in a finely uniform distribution are present throughout the filling material. Preferably, the filling materials during the addition of polyolefin powder are heated to a temperature in the range of about 140° C. to 150° C. and the gas is injected into such liquified mass at a pressure of approximately 1.5 to 15 barü at a temperature below about 140° C. and preferably in a temperature range of about 80° C. to 120° C.

BRIEF DESCRIPTION OF THE FIGURE

The FIGURE is a schematic highly enlarged illustration of a spatial network-like structure surrounding a gas bubble GB embedded in a filling material FM of a cable (not shown).

DESCRIPTION OF PREFERRED EMBODIMENTS

The principles of the invention apply to both optical communication cables, whose signal-carrying element comprising optical fibers and to electrical communication cables whose signal-carrying element comprises electrical conductors wherein the interiors of such cables are provided with a filling material containing a water-repellant substance and relatively small diameter gas bubbles uniformly intermixed and embedded in such filling material.

Cable filling material, in accordance with the principles of the invention, is admixed with a rubber-like thermoplastic material which is liquified or molten at the processing temperatures utilized in the course of cable filling and which solidifies at the normal operating temperatures of a cable by linking, hooking, coupling or otherwise joining via thermoplastic blocks having a correspondingly low melting range, that is lying just below the cable filling temperature and gas bubbles, which are generated during cable filling, are maintained at their respective spatial positions within the filling material by a rubber-like network which forms in the filling material and the linking points of such network are strong enough to withstand the buoyancy force of the gas bubbles without rupture.

For a more detailed explanation of the principles of the invention, reference is now made to the drawings wherein a schematic gas bubble, GB, is illustrated embedded within a filling material, FM, of a cable (not shown). Such gas bubble, which has an average diameter ranging from about 1$\mu$ to a maximum of 1.5 millimeter, is held within the filling material FM by elastic rubber-like molecular threads or chains, GF, which for example, are formed from diene chains. However, such chains may not be sufficiently positionally stable within an oil and/or wax containing filling material and may permit migration of gas bubbles therein, for example, as a result of buoyancy forces exerted thereby. Accordingly, thermoplastic blocks, TB, for example, formed from PE, waxes and the like, are provided for interconnecting the molecular chains, GF, somewhat in the manner shown. These thermoplastic blocks couple the elastic rubber-like molecular chains, GF, of the thermoplastic network within the filling material in such a manner that the gas bubbles distributed within the filling material are retained at their respective spatial positions within such filling material.

The relatively short period of time during which the higher processing temperatures are present after cable manufacture (i.e., after cable filling), until cooling and during which the thermoplastic blocks, TB, have not yet formed, is substantially harmless because during these short time periods no undesirably large migrational movements of the gas bubbles occur. The thermoplastic rubber-like materials form a retaining network produced by block polymerization of thread-like elastic molecular chains with thermoplastics which melt at approximately 60° to 80° C. At their melting temperatures, these thermoplastic blocks add onto one another and thus combine to form the retaining network.

In regard to the attainability of long-term stability of the foam-like mass formed in accordance with the principles of the invention, the following relationships are to be considered.

A gas bubble with a radius, r, moves in a freely flowable body having a viscosity, $\eta$, via a buoyancy force K in accordance with the relation:

$$v=(K/6)\pi\cdot\eta\cdot r \quad (1)$$

With the buoyancy force, K, being defined by:

$$K=4/3\cdot\pi\cdot r^3\cdot g\cdot\rho \quad (2)$$

wherein $\rho$ is the density of a freely flowable body and g is the gravitational constant, it follows that:

$$v=2/9\cdot(r^2\cdot g\cdot\rho)/\eta \quad (3)$$

As can be deduced from the above relations, velocity increases with the square of the size of the gas bubble and decreases with the viscosity, $\eta$, of the freely flowable body. Accordingly, the gas bubbles should be as small as possible, at best under a tenth of a millimeter, and the viscosity of the filling material should be as high as possible. Thus, it is not the dynamic viscosity which is significant but rather the static viscosity which occurs in instances of very small shear rates and low velocities. Such static viscosity is all the larger than the dynamic viscosity (which indeed determines processability) when the freely flowable "liquid" body contains increased amounts of longish thread-shaped constituents. This static value can vary from very large to infinite when such threads or molecular chains can form a genuine gel by cross-linkage. The material then behaves, for small mechanical stresses, like a solid body of extremely low stability. A mass of thermoplastic rubber-like material would approximately correspond to this picture, while a mass of non-cross-linked polymers having rubber-like characteristics would rather approximate liquids with a high static viscosity. The introduction of thread-like constituents, besides increasing static viscosity, provides yet another advantage relative to the stability of gas bubbles. That is, the bubbles during their movement, experience constant deflection and changes of direction so that an effective travelled path is significantly smaller than an actual travelled path. For example, if one assumes from the foregoing that an actual bubble travel path through a filling material of 1 millimeter is permitted over a time span of 30 years, then from relation (3) above, a necessary static viscosity of more than $10^7$ poise is required for a bubble having a diameter of approximately 0.05 millimeter.

The rubber-like materials described behave differently from a freely flowable mass of non-cross-linked polymers. In these latter systems, a network of elastic threads or chains is present having relatively wide opening which are filled with oil and/or wax constituents. An analysis of this two-phase system, both the network causing the static stability and the admixed liquids must be considered. In a state of rest, the network can absorb tensile and shearing forces only up to quite a low rupture limit, while the liquid phase remains moveable within the openings and approximately follows the laws of hydrostatics. Gas bubbles embedded in such liquid experience a buoyancy force, which in the proximity of the bubble, is transferred via surface tension to the network and places it under tensile, shearing and possibly also compressive stresses. Here, the rupture mechanism of the network must take the place of the viscosity analysis carried out above. The tensile stress, $\sigma_2$, below a bubble is approximately defined by the relation:

$$\sigma_z=K/r^2\cdot\pi=(4/3)\pi\cdot g\cdot r\cdot\rho \quad (4)$$

Besides the acceleration due to gravity, g, and the density differential, $\rho$, the tensile stress only depends upon the bubble radius. For a radius of 0.05 millimeters, a tensile stress of only 2 $N/m^2$ results. A more precise analysis must include the complete stress situation (including shearing stress) around a bubble and will lead to lower local stresses. A system dimensioned according to relation (4) is sufficient for the present purposes. For each static stability (influencable by the nature and quantity amount of the network), a maximum permitted bubble size can be derived from relation (4) above or, if this is predetermined technologically, because of relation (4) one can derive a minimum necessary quantity relation for admixing of a predetermined material forming such network.

Further, since the size of the buoyancy force depends upon the diameter of a gas bubble, it is a particularly simple manner, by selection of various sized bubbles, to determine the buoyancy force which can be withstood by a network structure. Yet further, the largest allowable bubble size can be simply determined for a given material by routine observations with different sized gas bubbles and observationally determining at which diameter value no rupture or migration occurs.

In selecting the admixture of thermoplastic materials utilized for filling a cable, one must bear in mind that such admixture must be easy to process and on the other hand, the spatial lattice structures formed by linking, hooking or connection via thermoplastic blocks must be designed such that as solid a support as possible is attained for the gas bubbles. This retension of gas bubbles against the movement is necessary so as to prevent the gas bubbles, over the course of a rather prolonged period of time and perhaps under the influence of prevailing ambient temperatures and pressure conditions, from being set into motion and uniting into larger gas bubbles.

The use of a powder form of thermoplastic admixtures in the practice of the invention provides the advantage that such powders dissolve more quickly in the filling materials and simultaneously insure that the resultant admixture is uniform throughout the entire filling mass. Proceeding from this initial situation, also the formation of spatial lattice structures from such admixtures is favorably influenced as a result of the smaller particles in the admixture and their better mingling with the filling materials. Longitudinally water-tight cables constructed in this manner thus display particularly favorable characteristics with respect to the solidity and stability of its lattice structure over prolonged time periods and in their manufacturing processes.

In typical embodiments of the invention, the amount of gas bubbles present in a filling material is adjusted so as to range between about 10 to 80% (volume basis). Particularly, advantageous values, relative to electrical and mechanical characteristics, as well as relative to material consumption and admixture, result when the volume amount of gas bubbles present in a filling material ranges between about 50 to 70%, based on the total volume of the filling material.

The amount of gas bubbles added, as well as the formulation or selection of the constituents for a filling material are controlled in such a manner that as low a value of relative permittivity is attained, preferably less than about 1.5 to 1.7.

In embodiments where polyethylene powder is utilized, it is practical to select an initial polyethylene polymer which has approximately 5,000 to 200,000 carbon atoms per molecule thereof.

In method embodiments of the invention utilizing polyolefin powders, a select amount of a polyolefin powder is added, with stirring, to a heated filling material (typically comprised of oils and/or waxes) to attain a substantially homogeneous liquid mass, a gas under a select pressure, for example, in the range of about 1.5 to 15 barü, is injected into such an admixture to attain a gas-liquid mass and the gas-liquid mass is then injected into a cable while releasing such pressure and allowing such mass to cool whereby relatively small diameter gas bubbles are substantially uniformly formed within the solidified filling material in the cable.

An exemplary filling material formulation used with polyolefin powder comprises:

77% paraffin oil
19.9% polypropylene
3% finely dispersed silicic acid
0.1% stabilizer (anti-oxidant agent)

In preferred embodiments of the invention, stabilization of gas bubbles in a filling mass or material is attained by admixing powdered form polyolefins, preferably polyethylene, having a density in the range of about 0.915 to 0.96 g/ml. Such powder is preferably of a relatively fine uniform average grain size, preferably in the range of about 20 to 600μ. The addition of such polyolefin powder proceeds at the elevated temperature of the other constituent forming the filling material, which typically lies above the crystalline melting point of the polyolefin, that is, above about 135° C. In other words, the filling material is heated to a temperature above the melting point of the polyolefin, preferably heated to a temperature in the range of about 140° to 150° C. with stirring so as to attain a substantially homogeneous liquid mass. Then, at a suitable over-pressure, a gas, for example, $CO_2$, $N_2$, air, Freon or other suitable gas, is injected into the hot, substantially homogeneous liquid mass and then fed into a cable. With a substantially simultaneous cooling and release of pressure (that is the over-pressure is discontinued), finely distributed gas bubbles form within the interior of the cable and which are spatially fixed at their respective positions by the more or less continuous flexible network formed by the various hydrocarbons present in the filling material.

An exemplary formulation of an admixture of constituents suitable for the practice of the invention is:

69.8% paraffin oil
18.1% polypropylene (atactic)
2.7% silicic acid (finely dispersed)
0.3% stabilizer (protection against oxidation of, among other constituents, PE)
9.1% polyethylene powder With this type of cable filling material formulation, the admixture, after injection into a cable and cooling, does not recrystallize in discrete regions or non-uniformly but instead forms a more or less continuous spatial lattice or network structure which uniformly fills the entire filling mass and secures the embedded gas bubbles against undesired migration or movement.

A lowermost limit for the amount of polyolefin powder useful in a filling mass formulated in accordance with the principles of the invention is approximately 5% while the uppermost limit is approximately 30% (weight percent). A practical range, in terms of weight percent, for the amount of polyolefin, preferably polyethylene, powder utilized in accordance with the principles of the invention extends from about 6% up to about 20%, and optimal values were attained with the additions of 8 to 10 weight percent of polyethylene powder to other constituents of a cable filling material formulation.

Other materials useful in formulating the filling mass can, generally, be selected as desired. The only precaution to be taken in selecting such materials is that they do not prevent the formation of the spatial lattice or network within an admixture with the thermoplastic (polyolefin) material. Thus, for example, such materials can advantageously be selected from the group consisting of petrolates, hydrocarbon waxes, aliphatic or cyclo-aliphatic paraffins, polymeric olefins, rubber compounds, bituminous compounds and/or mixtures thereof.

During production of a cable structure in accordance with the principles of the invention, a pre-formulated filling material (for example, composed of one of the earlier mentioned materials or mixtures of two or more such materials) is heated, for example to about 140° to 150° C. With continuous heating and stirring, a measured amount of a suitable polyolefin powder, preferably a polyethylene powder, is added. The stirring and heating is continued until the powder is melted and homogeneously distributed throughout the resultant liquid mass.

In embodiments where direct cable filling occurs, the above liquified mass is fed into a typical foaming device and a gas ($CO_2$, $N_2$, air, etc.) is injected at approximately 140° C. at a select pressure, for example 1.5 to 15 bar over atmospheric pressure. The resultant gas-liquid admixture is then injected into a cable. After release of the pressure and simultaneous cooling of the injected mass within the cable, gas bubbles are generated within this mass in a uniformly distributed manner and attain an average bubble diameter in the range of about 1μ to 1500μ and more preferably in the range of about 20μ to 200μ. The gas bubble formation advantageously occurs at a temperature range of about 80° to 120° C. The foaming of this mass can occur either at a suitable injection nozzle in a cable or at a conductor stranding station for a cable core.

However, in other embodiments, the above process can be interrupted after the introduction and homogeneous distribution of the polyolefin powder into the selected filling material formulation and stored in a cooled state until required for cable filling. At that time, such mass can merely be reheated to liquify the same and thereafter the gas injection, etc., proceeds as above.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

We claim as our invention:

1. In a longitudinally water-tight communication cable structure having at least one signal-carrying element therein and a jacket for sealing the interior of such structure off from the outside and having in the interior thereof a filling material containing a water-repellant substance and relatively small-diameter gas bubbles embedded in such filling material, the improvement comprising:

wherein said filling material is comprised of a rubber-like network formed from a polyolefin powder;

said polyolefin powder having a crystalline melting point lower than the processing temperature of the remaining constituents of said filling material;

said polyolefin powder having an average grain size in the range of about 20 to 600 μm; said polyolefin powder having a density in the range of about 0.915 to 0.96 g/ml; and said polyolefin powder being present in said filling material in an amount in the range of about 5 to 30 weight percent, based on the total weight of said filling material; and wherein said gas bubbles have an average diameter in the range of about 1 to 1500μ, said gas bubbles being maintained in their respective spatial positions within said filler material by said rubber-like network.

2. In a cable as defined in claim 1, wherein said polyolefin powder is a polyethylene powder.

3. In a cable as defined in claim 1, wherein the amount of gas bubbles in the filling material ranges between about 10 to 80% by volume.

4. In a cable as defined in claim 3, wherein the amount of gas bubbles within the filling material ranges between about 50 to 70% by volume.

5. In a cable as defined in claim 1, wherein the amount of gas bubbles and the formulation of said filling material are controlled so as to attain a relative permittivity of less than about 1.5 to 1.7.

6. In a cable as defined in claim 1, wherein said polyolefin powder comprises a polyethylene powder formed from a polyethylene polymer having about 5,000 to 200,000 carbon atoms per molecule thereof.

7. In a cable as defined in claim 1, wherein the amount of polyolefin powder in said filling material is in the range of about 6 to 20 weight percent, based on the total weight of said filling material.

8. In a cable as defined in claim 1, wherein the amount of polyolefin powder in said filling material is in the range of about 8 to 10 weight percent, based on the total weight of said filling material.

9. In a cable as defined in claim 1 wherein said gas bubbles have an average diameter in the range of about 20μ to 200μ.

* * * * *